United States Patent
Emge et al.

(10) Patent No.: US 6,351,310 B1
(45) Date of Patent: Feb. 26, 2002

(54) REDUCED MINIMUM CONFIGURATION INTERFEROMETRIC FIBER OPTIC GYROSCOPE WITH SIMPLIFIED SIGNAL PROCESSING ELECTRONICS

(75) Inventors: Steven R. Emge, Mokena; Sidney M. Bennett, Chicago, both of IL (US)

(73) Assignee: KVH Industries, Inc., Middletown, RI (US)

( * ) Notice: Subject to any disclaimer, the term of this patent is extended or adjusted under 35 U.S.C. 154(b) by 0 days.

(21) Appl. No.: 09/459,438

(22) Filed: Oct. 4, 2000

Related U.S. Application Data

(63) Continuation of application No. 08/835,307, filed on Apr. 7, 1997, now abandoned
(60) Provisional application No. 60/015,884, filed on Apr. 19, 1996.

(51) Int. Cl.$^7$ .............................................. G01C 19/72
(52) U.S. Cl. ....................................... 356/460; 356/463
(58) Field of Search ................................. 356/350, 460, 356/463, 464, 466

(56) References Cited

U.S. PATENT DOCUMENTS

| | | | |
|---|---|---|---|
| 4,571,650 A | 2/1986 | Ojima et al. | |
| 4,776,700 A | 10/1988 | Frigo | 356/350 |
| 4,842,409 A | 6/1989 | Arditty et al. | 356/350 |
| 4,848,910 A | 7/1989 | Dupraz | 356/350 |
| 5,108,183 A * | 4/1992 | Fling et al. | 356/460 |
| 5,285,257 A * | 2/1994 | Negishi | 356/464 |
| 5,412,472 A * | 5/1995 | Okada et al. | 356/463 |

FOREIGN PATENT DOCUMENTS

| | | |
|---|---|---|
| DE | 37 42 201 A1 | 6/1989 |
| EP | 0 551 874 A2 | 7/1993 |
| EP | 0 586 242 A1 | 9/1994 |
| EP | 856 737 A1 | 8/1998 |

OTHER PUBLICATIONS

Dupraz, J.P., "Fiber–Optic Interferometers for Current Measurements: Principles and Technology", Alsthom Review No. 9: 29–44 (Dec. 1987).

Frosio, G. and Dändliker, "Reciprocal Reflection Interferometer for a Fiber–Optic Faraday Current Sensor", Applied Optics 33 (25): 6111–6122 (Sep. 1, 1994).

Short, S. et al., "Elimination of Birefringence Induced Scale Factor Errors in the In–Line Sagnac Interferometer Current Sensor", Journal of Lightwave Technology 16 (10): 1844–1850 (Oct. 1998).

* cited by examiner

*Primary Examiner*—Samuel A. Turner
(74) *Attorney, Agent, or Firm*—Foley Hoag & Eliot, LLP

(57) ABSTRACT

An interferometric fiber optic gyroscope (IFOG) system includes a fiber sensing coil and a semiconductor or rare-earth doped fiber light source emitting light with an associated light source intensity. The source has a front output and back output. An optical coupler is attached to the front output for receiving said light from said light source and the coupler creates two substantially equal intensity light beams for simultaneous transmission into the sensing coil said coupler attached to the coil. The fiber sensing coil supplies return light to the coupler from said equal intensity light beams and the coupler combines and interferes the return light into a combined light beam. An optical phase modulator has a phase modulation amplitude, and the modulator coupled to the coil. An oscillator is coupled to the modulator and produces a periodic voltage which controls the phase modulation amplitude. The combined light signal is transmitted through the light source and received by the detecting means coupled to said light source at the back output. Light detection means detect and convert the combined light beam into an electrical current. An electrical amplifier is coupled to the detector for converting said current into an electrical voltage. Alternating current voltage amplitude controller means is coupled to the amplifier, and controls the associated light source intensity. Electrical signal processing means is coupled to the amplifier and processes the voltage and provides an output signal proportional to the angular rotation rate input of the sensing coil.

84 Claims, 5 Drawing Sheets

REDUCED MINIMUM CONFIGURATION INTERFEROMETRIC FIBER OPTIC GYROSCOPE WITH SIMPLIFIED SIGNAL PROCESSING ELECTRONICS

CROSS REFERENCE RELATED APPLICATION

This application is a continuation of U.S. application Ser. No. 08/835,307, filed Apr. 7, 1997, now abandoned.

This is a complete application claiming the benefit of copending provisional patent application Ser. No. 60/015,884; filed Apr. 19, 1996.

FIELD OF THE INVENTION

The present invention relates to gyroscopes. Specifically, the invention relates to gyroscopes and their signal processing electronics.

BACKGROUND

The interferometric fiber optic gyroscope (IFOG) is an established technology for accurately measuring angular rotation. Because the IFOG is an optical, solid state design with no moving parts, it can be used for long life, high reliability applications such as land vehicle navigation.

Requirements for a gyroscope intended for use in land navigation systems with coupled dead-reckoning (DR) and GPS (Global Positioning System) input are governed more by cost than by performance considerations. The gyro is used as a gap filler for those systems where no outage is permissible. The GPS data can then be used to periodically correct the dead reckoning sensors, reducing the demands on each. The cost of this type of land navigation system is heavily dependent on the cost of the gyroscope employed. Although the wide performance range of the IFOG makes it well suited for applications such as land navigation, further cost reduction in the gyroscope optical configuration and electronic signal processing is required to make this technology economical to use for many systems such as land navigation systems.

The fundamental working principal behind the IFOG is the Sagnac effect. In this effect, two counter-propagating light waves traversing a loop interferometer acquire a phase difference when the loop is rotated about its axis. The IFOG uses fiber optic components to form the Sagnac interferometer. Accurate measurement of the Sagnac phase difference induced by rotation requires the parasitic phase differences, which can vary with environment, be suppressed. For this reason the principal of optical reciprocity is used to select portions of the counter-propagating waves which pass through the interferometer along a common path. Variations of the system by the environment changes the phase of both waves equally and no difference in phase delay results; the sensor is environmentally stable. The use of optical reciprocity in the IFOG architecture results in what is commonly referred to as the "minimum configuration."

In the minimum configuration (MC) IFOG the light is emitted from a semiconductor or rare-earth doped fiber light source, passes through the first coupler where half of the light is dissipated, and half is sent into the interferometer through the polarizer. A second coupler splits the light into two approximately equal intensity, counter-propagation beams which traverse the coil. The two light beams then recombine at the second coupler where they interfere. This combined light beam then passes through the polarizer a second time in the opposite direction, and half of the light is directed to the detector by the first coupler. The first coupler is not part of the optically reciprocal Sagnac interferometer. Its sole purpose is to direct some of the returning light into a photodetector and to minimize direct coupling of light energy from the source to the detector. To maximize the optical power incident on the detector, the optimum splitting ratio of this coupler is 3 dB. This leads to an inherent 6 dB of system loss since this coupler is passed twice; it is independent of the coupler insertion loss.

In order to reduce the optical configuration complexity and cost, yet maintain the principal of reciprocity, a "reduced minimum configuration" is used. In the reduced minimum configuration (RMC) IFOG, the first coupler has been removed and the interferometer output is read out through a detector positioned at the back facet output of the light source. The light passes through the source before being received by the detector. The RMC gyroscope maintains the principal of optical reciprocity since the light in the interferometer still traverses a common optical path. The inherent system loss of 6 dB from the first coupler is eliminated. Also, depending on the type of light source chosen, and the drive current operating range, the source can act as an optical amplifier for the returning light. Therefore, the signal-to-noise ratio of the RMC gyroscope is as good, and potentially can be better than the conventional MC gyroscope design. Many low cost laser diode packages contain a back facet photo-detector. Thus, the detector is provided by the laser diode manufacturer and the cost of purchasing a separate detector is eliminated in this design. Also, the equipment and labor needed to align the first coupler output fiber to a separate detector is eliminated. The detector is aligned to the back facet by the manufacturer of the laser diode. When the input fiber pigtail is aligned to the optical source, the output is automatically aligned to the detector in the same operation. The RMC also eliminates two fiber-to-fiber fusion splices, further reducing the optical assembly cost.

A piezo-electric transducer (PZT) is used in both the MC and RMC IFOGs to modulate the phase difference between the two counter-propagating light beams. Other methods of modulating the phase difference, for example, electro-optic material such as lithium niobate can be used. This phase modulation serves two purposes. One is to move or bias the interferometer to a more sensitive operating point and also allow the determination of rotation sense. The other is to move the detected signal from direct current (DC) to alternating current (AC) in order to improve the accuracy of the electrical signal processing. With sinusoid phase modulation, the interferometer output signal is a infinite series of sine and cosine waveforms whose amplitudes are Bessel function related to the phase modulation amplitude. The fundamental signal is at the applied modulation frequency with subsequent odd and even harmonic signals. Many signal processing approaches have been proposed which use the ratio of the fundamental and the next three lowest order harmonic signals amplitudes to detect rotation rate while at the same time maintaining a stable, linear output scale factor. However, implementation of these approaches in analog and/or digital electronic hardware is complex and expensive. Also, the use of the light source as both a light emitter and amplifier is not without problems. Distortion of the interferometer signal can occur due to traversing the light source prior to detection and due to bandwidth limitations of the back facet photo-detector. The signal harmonic amplitudes can be altered by these effects leading to a measured output rotation scale factor error if the RMC gyroscope design is used with the conventional harmonic ratio signal processing methods. This is a significant drawback in multiharmonic processing methods. Therefore, a much simpler signal processing design, which is not affected by an error in the relative amplitude of the gyroscope harmonic signals is desired.

Scale factor linearity (i.e. measured output rate versus input rate applied) is maintained due to the intrinsic linearity of the Sagnac effect for low rotation rates and is a sinusoid for larger rates. However, the more difficult problem is maintaining a constant scale factor during environment changes (i.e. temperature, vibration, etc.) and over the life time of the sensor.

SUMMARY OF THE INVENTION

It is an object of the present invention to provide an IFOG signal processing system which performs well for both the MC and RMC gyroscope designs.

It is a further object of the present invention to provide an IFOG signal processing system which is simple and low-cost to produce.

It is a yet another object of the invention to provide an IFOG system which accurately determine rotation rate of the sensor coil.

It is still another object of the invention to provide an IFOG system which maintains a constant scale factor during environmental changes.

It is a further object of the invention to provide an IFOG system with simplified signal processing electronics and which eliminates non-essential optical components and splices.

The foregoing objects are provided by an improved IFOG system which comprises a fiber sensing coil; a semiconductor or rare-earth doped fiber light source emitting light with an associated light source intensity, said source having a front output and back output; an optical coupler attached to said front output for receiving said light from said light source, said coupler creating two substantially equal intensity light beams for simultaneous transmission into said sensing coil said coupler attached to said coil; wherein said fiber sensing coil supplies return light to said coupler from said equal intensity light beams and said coupler combines and interferes said return light into a combined light beam; an optical phase modulator having a phase modulation amplitude, said modulator coupled to said coil; an oscillator coupled to said modulator said oscillator producing a periodic voltage which controls said phase modulation amplitude; light detection means for detecting and converting said combined light beam into an electrical current, said combined light signal being transmitted through said light source and received by said detecting means coupled to said light source at said back output; an electrical amplifier coupled to said detector for converting said current into an electrical voltage; alternating current voltage amplitude controller means coupled to said amplifier, for controlling said associated light source intensity; and electrical signal processing means coupled to said amplifier for processing said voltage and providing an output signal proportional to the angular rotation rate input of said sensing coil.

DETAILED DESCRIPTION OF THE PREFERRED EMBODIMENT

Figure 1:
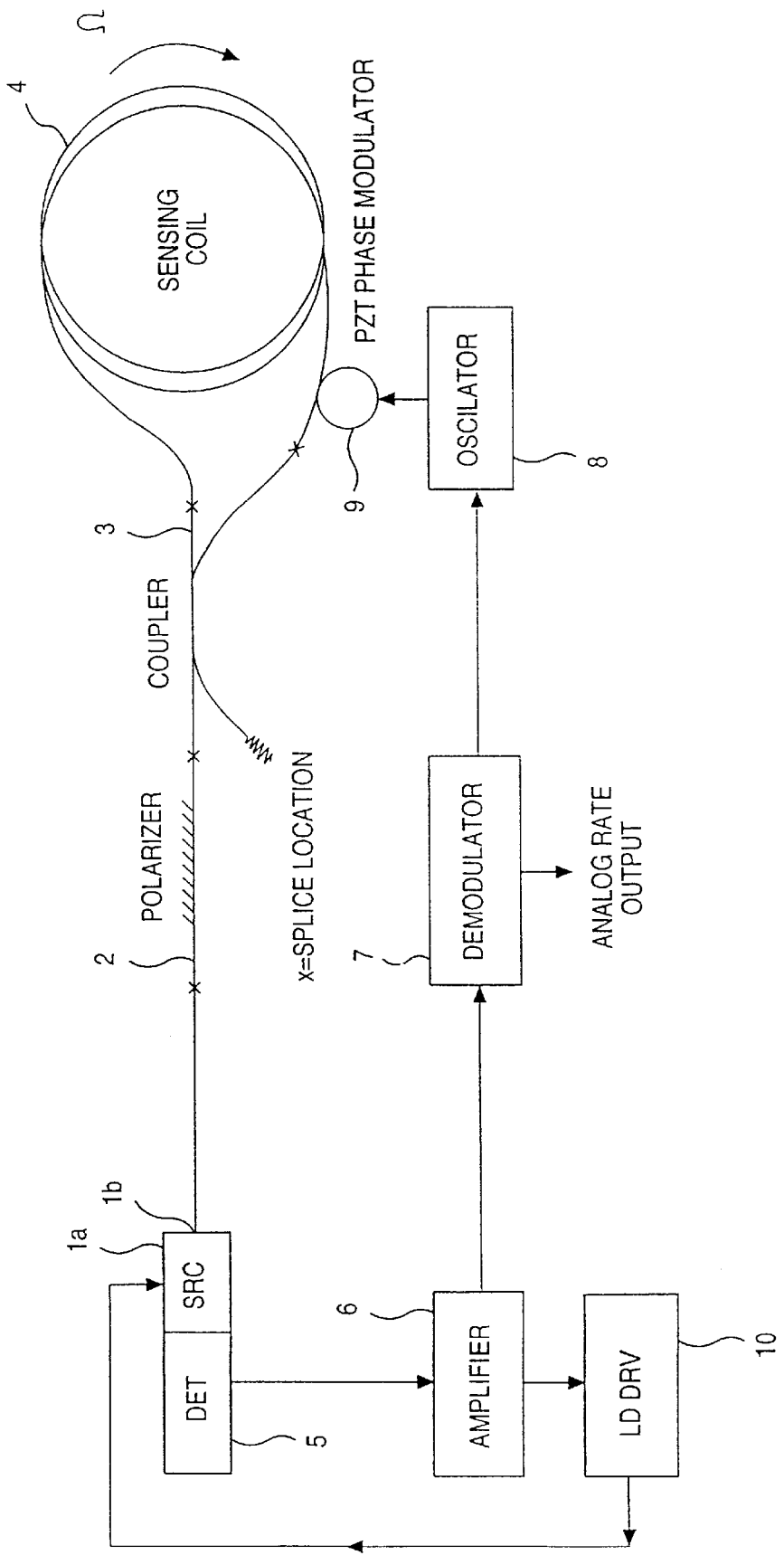
FIG. 1 is a schematic drawing showing an IFOG system according to principles of the current invention.

While the invention is susceptible to various modifications arid alternative forms, specific embodiments thereof have been shown by way of example in the drawings and will herein be described in detail. It should be understood, however, that this is not intended to limit the invention to the particular forms disclosed, but on the contrary, the intention is to cover all modifications, equivalents, and alternatives falling within the spirit and scope of the invention as defined below.

An improved IFOG system of the present invention is described below and illustrated in FIG. 1. Light source 1a emits light from a front facet output 1b which is polarized by polarizer 2. Several types of semiconductor light sources can be used including a laser diode (LD), superluminescent diode (SLD), and light emitting diode (LED). Additionally, the polarizer can be a fiber or lithium niobate polarizer. The light is split by coupler 3 into two approximately equal intensity, counter-propagating beams which traverse the fiber sensing coil 4 and then combine and interfere at the coupler 3. The sensing coil can be constructed from polarization-maintaining single-mode fiber, single-mode fiber, or fiber that supports a plurality of modes. Additionally, the coupler can be a directional coupler formed from optical fiber or a Y-junction splitter formed on a lithium niobate substrate. The newly combined light beam then passes through the active region of source 1a and is received at a back facet output 1c by detector 5. Detector 5 is photodetector and transimpedance amplifier with light as an input and voltage as an output. The output of detector 5 is passed through amplifier 6 which increases the sensor's output signal to a detectable level. The total electrical gain is around one million in this embodiment. The amplifier output is applied to demodulator 7. Demodulator 7 is a phase sensitive detector (PSD) which receives a signal from oscillator 8. The actual output is a function of rotation rate about the sensitive axis and is essentially sinusoidal for low to moderate rates. If the phase and frequencies of the two signals entering demodulator 7 are the same, the output is at a maximum, if they are different, the output is reduced. Oscillator 8 and PZT phase modulator 9, as will be explained in greater detail below, maintain the interferometer depth of the phase modulation. Alternatively, other phase modulators can be used such as those constructed from lithium niobate or quartz. Light source controller 10, as will be explained in greater detail below, is a filter, rectifier, and integrating comparator which regulates the intensity of the light source.

Figure 2:
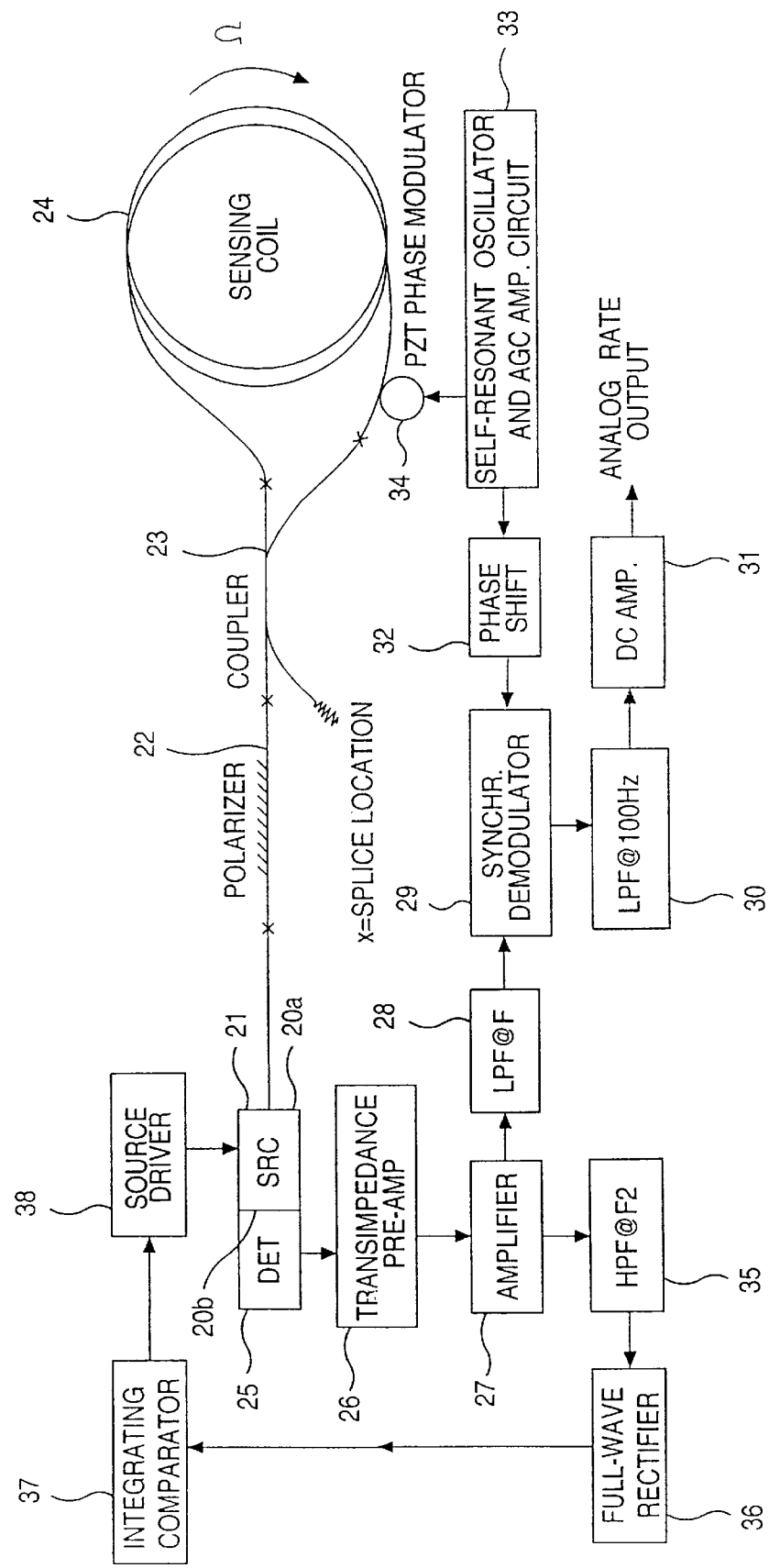
FIG. 2 is a schematic drawing showing an IFOG system according to principles of the current invention.

Another embodiment of the improved IFOG system of the present invention is illustrated in FIG. 2. Semiconductor light source 21 emits light from a front facet output 20a which is polarized by polarizer 22. The light is split by coupler 23 into two approximately equal intensity, counter-propagating beams which traverse the sensing coil 24 and then combine and interfere at the coupler 23. The newly combined light beam then passes through the active region of source 21 and is received at a back facet 20b by detector 25. The detector is a photodetector receiving light as an input and producing current as an output.

Many low cost semiconductor light source packages contain a back facet photo detector. Thus, the detector is provided by the light source manufacturers. Using this approach, the cost of purchasing a separate detector is eliminated. The detector 25 is aligned with the back facet output 20b by the manufacturer of the light source. When the input fiber pigtail is aligned to the optical source, the output is automatically aligned to the detector in the same operation. This approach also eliminates several fiber splices. Integration of the polarizer onto the coupler combined with pigtailing this coupler/polarizer assembly onto the light source could further reduce the number of optical splices. Alternatively, it is possible to fabricate all of the required fiber components on a single length of fiber.

For most land navigation applications, the input rotation rate range of the vehicle is limited by the speed and turning radius of the vehicle. For example, for high performance cars, a maximum rate range of +/−100°/sec is sufficient. Because of this limitation, the sensing coil's Sagnac scale factor can be designed so that this maximum rate range is well within an essentially linear region of the gyroscope output transfer function. The sensing coil is constructed using a short fiber coil length wound on a small diameter bobbin. With this type of construction, the rotation rate can be directly determined from the amplitude of the fundamental signal (F1). Since the phase and frequency of the fundamental signal are well known, the most effective way to determine the amplitude is by synchronous demodulation.

The detected gyro broad band signal is passed through transimpedance pre-amplifier 26 which converts the current to voltage and amplifier 27 which amplifies the voltage signal to a useable level. This voltage signal is then applied to a low pass filter (LPF) 28 whose corner frequency is at the fundamental frequency F1 prior to the synchronous demodulation process. The low pass filter 28 attenuates all harmonics from the voltage signal leaving only the fundamental frequency. The signal is then passed to synchronous demodulator 29. Synchronous demodulator 29 has as its other input a voltage signal which originates from a self-resonant oscillator and amplifier circuit 33, which, as discussed below, preferably uses a Colpitts oscillator and AGC amplifier to provide a stable amplitude and self-resonant frequency to the modulator 34. However, as is well known in the art, the circuit 33 can be a crystal oscillator providing a fixed amplitude, fixed frequency signal or can be a Colpitts oscillator (only) providing a fixed amplitude, self-resonant signal to the modulator.

As the output of circuit 33 is passed through phase shifter and low pass filter 32 whose corner frequency is at the fundamental frequency F1, the signal is locked into the fundamental frequency with the same phase shift as the signal provided from LPF 28. The output of demodulator 29 is at a maximum when the phases and frequencies of its input signals are equal, and is proportional to the magnitude of the gyro output signal at the fundamental frequency F1 which is a function of rotation rate. This output is passed through low pass filter 30 where a DC signal proportional to the rotation rate is created. Finally, DC amplifier 31 amplifies the resultant signal to set the desired sensor scale factor. The demodulation produces a linear output over a very wide dynamic input rate range. Resolution of the rotation measurement is determined by the noise figure of the transimpedance pre-amplifier 26 used and the bandwidth of the measurement.

Maintaining a constant scale factor during environmental changes requires that two gyro operating points be accurately maintained. First, the amount of gyro signal at the output of the amplifier 27 must be constant. To accomplish this, the invention takes advantage of the fact that for short coil length sensors, the amplitude of the second harmonic signal (F2) is relatively constant over the entire rate range. Thus, the broad-band gyro signal is high pass filtered (HPF) at the second harmonic frequency (F2) by a high pass filter 35, rectified by full-wave rectifier 36, integrated and compared with a reference by integrating comparator 37, and applied to source 21 by source driver 38. The resulting DC signal is used to control the output intensity of source 21 by increasing or decreasing the light source current and therefore the emitted optical power. High pass filter 35 may be required to reduce the influence of the fundamental signal (F1) on the light source control circuit accuracy at high rotation rates. As is well known in the art, the high-pass filter 35 may be interchanged with a dc-block or band pass filter and the full-wave rectifier 36 may be interchanged with a half-wave rectifier.

The second important gyro operating point which must be maintained is the interferometer depth of phase modulation controlled at PZT phase modulator 34. The depth of phase modulation is set by the amplitude of the sine wave drive voltage applied to the PZT phase modulator 34. However, only maintaining a fixed frequency and amplitude sine wave drive will not guarantee a fixed depth of phase modulation. Over time and temperature changes, the resonant frequency (Fr) of the PZT modulator 34 will drift. Also, the mechanical to optical phase shift conversion scale factor (Qm) will vary.

As discussed above, the invention uses the PZT phase modulator 34 as an active part of the oscillator circuit by applying the output of self-resonant oscillator and adjustable gain controlled (AGC) amplifier circuit 33 to phase shifter and low pass filter 32. Because the PZT modulator 34 is part of the active feedback circuit, any movement in the PZT resonant frequency is tracked. Changes in Qm and Fr also change the dynamic impedance of the PZT effecting the drive amplitude. Self-resonant oscillator and AGC amplifier circuit 33 is used to maintain a stable sine wave drive amplitude through environment, although other self-resonant oscillators could also be used.

Thus, a gyro system with simplified signal processing electronics is provided where the fundamental gyro signal amplitude is synchronously demodulated to determine the rotation rate of the sensor. The second harmonic gyro signal (F2) is used to control the light source intensity. Taking the ratio of these signals is not required. The depth of phase modulation is maintained by using a self resonant oscillator approach with the PZT as part of the active electrical circuit.

This configuration eliminates non-essential optical components and splices from the system, allowing for the construction of a lower cost gyroscope. Using the reduced minimum configuration gyroscope with this simplified signal processing electronics approach produces a very attractive cost-to-performance ratio rotation rate sensor for use in many land vehicle navigation applications, such as applications requiring the use of dead-reckoning sensors coupled to GPS systems. The IFOG signal processing system is simple and low-cost to produce, accurately determines rotation rate of the sensor coil, and maintains a constant scale factor during environmental changes.

Figure 3:
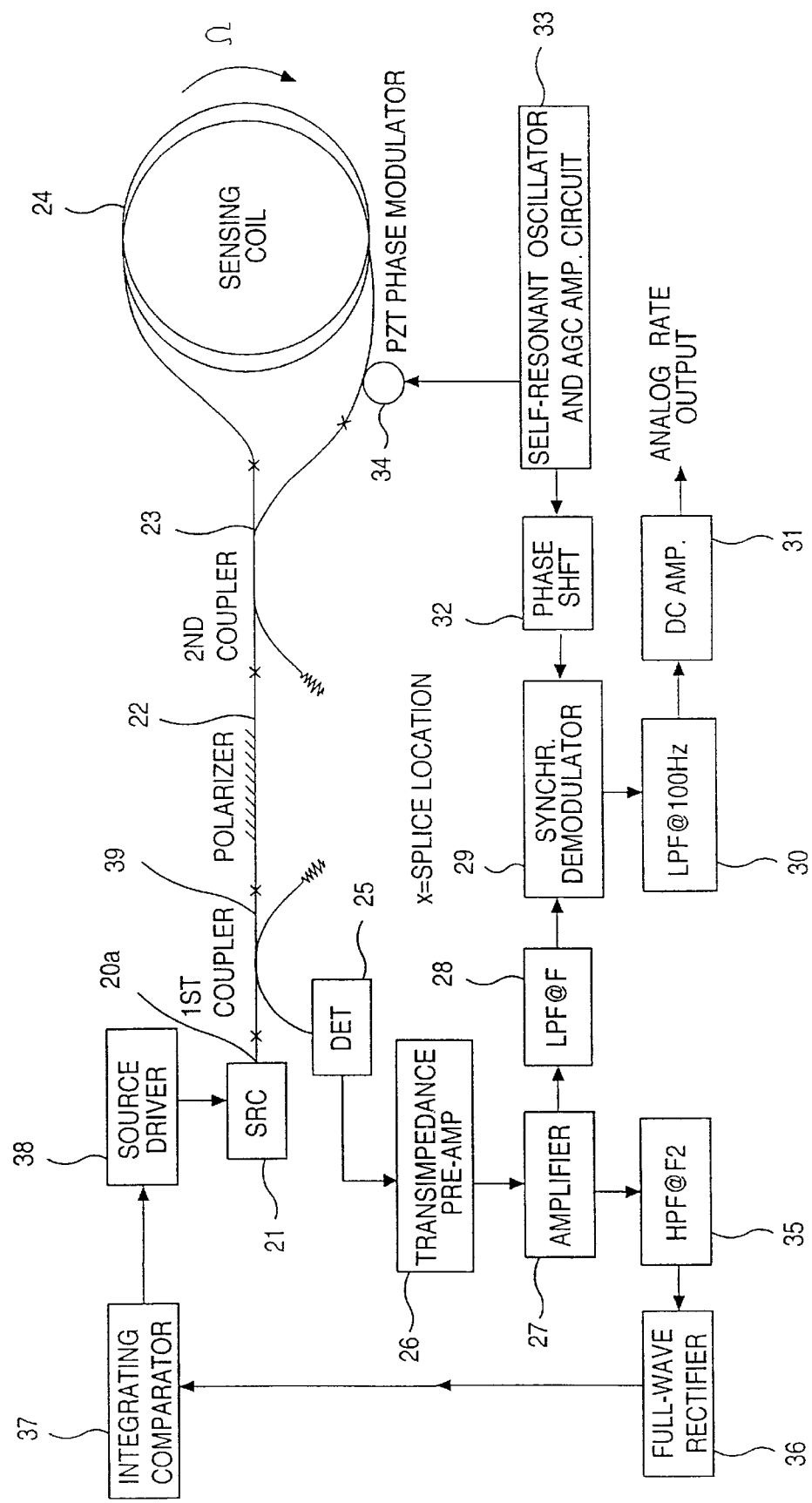
FIG. 3 is a schematic drawing showing an IFOG system according to principles of the current invention.

As shown in FIG. 3, a minimum configuration IFOG, rather than a reduced minimum configuration IFOG can be used with the signal processing electronics described above with reference to FIG. 2. In this embodiment, the source/detector arrangement is replaced by a source 21 and a detector 25, and a first coupler 39 is inserted between the laser and the polarizer. The operation of the rest of the circuit is as described above. Using the minimum configuration gyroscope with this simplified signal processing electronics approach produces a very attractive cost-to-performance angular rate sensor for use in many land vehicle navigation and platform stabilization applications. The IFOG signal processing system is simple and low-cost to produce, accurately determines rotation rate of the sensor coil, and maintains a constant scale factor during environmental changes.

Two gyro systems were constructed and tested. The first unit was a standard open-loop, all-fiber, minimum configuration as described in the preceding paragraph. The second unit was identical, except modified by removing the first coupler and detecting the gyro signal from the source back facet photodiode as described above in connection with FIG. 2. All optical components were fabricated using Andrew Ecore® polarization maintaining (PM) single-mode fiber. The Sagnac coil length used was 75 meters with a nominal diameter of 65 mm. The modulator was constructed by wrapping fiber around a piezo-electric transducer (PZT). A standard compact disc laser diode light source was used. The optical circuit was integrated with a analog demodulator electronics board in a rectangular form factor (4.25×3.25× 1.5 inches) assembly which weighed 0.55 pounds. The unit operated at +12 VDC unconditioned power, such as would be found in an automobile, and the output was a differential analog voltage. A total power consumption of two watts was typical for the completed gyroscope with electronics.

Figure 4A:
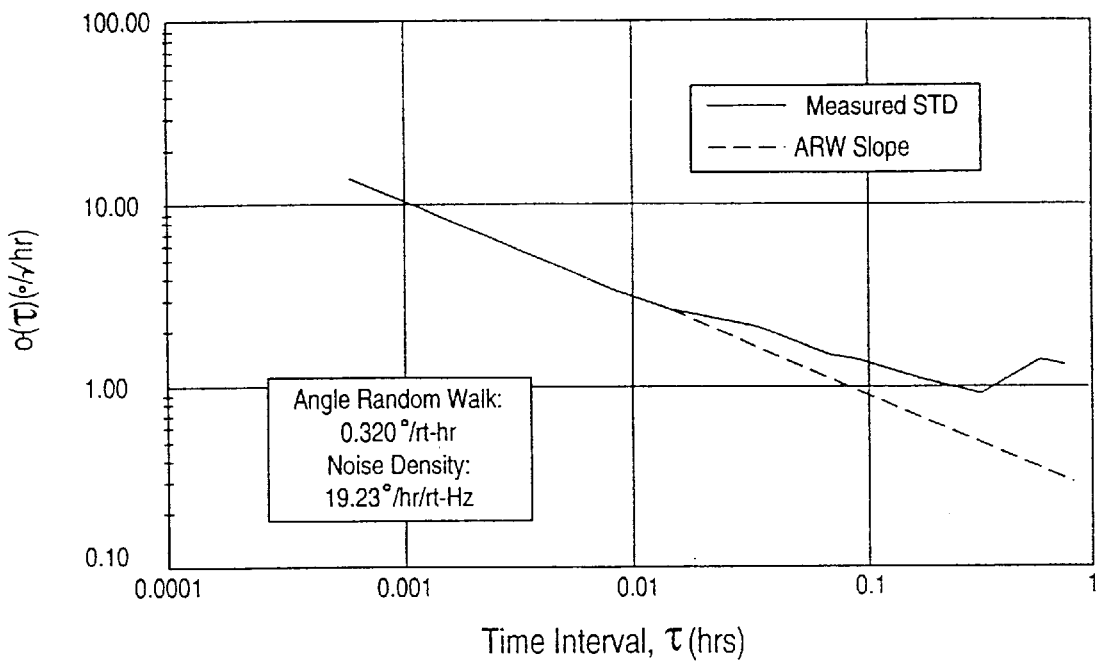
FIG. 4(a) is a graph of performance data in the form of an Allan variance analysis for a minimum configuration IFOG system of the current invention.
Figure 4B:
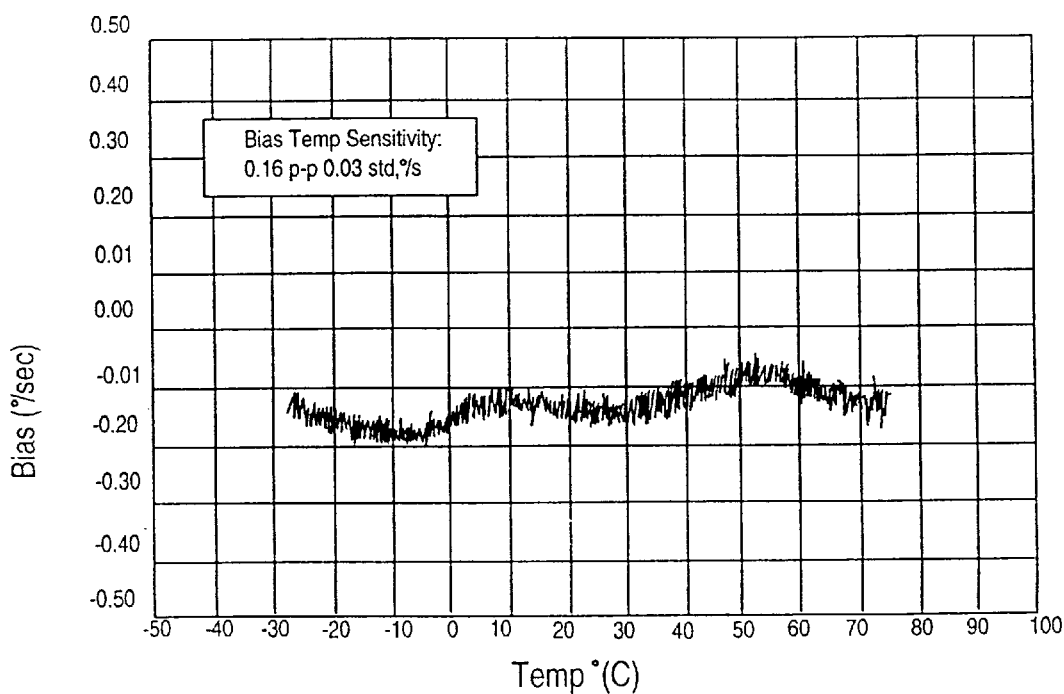
FIG. 4(b) is a graph of performance data in the form of bias temperature sensitivity for minimize configuration IFOG of the current invention.
Figure 5A:
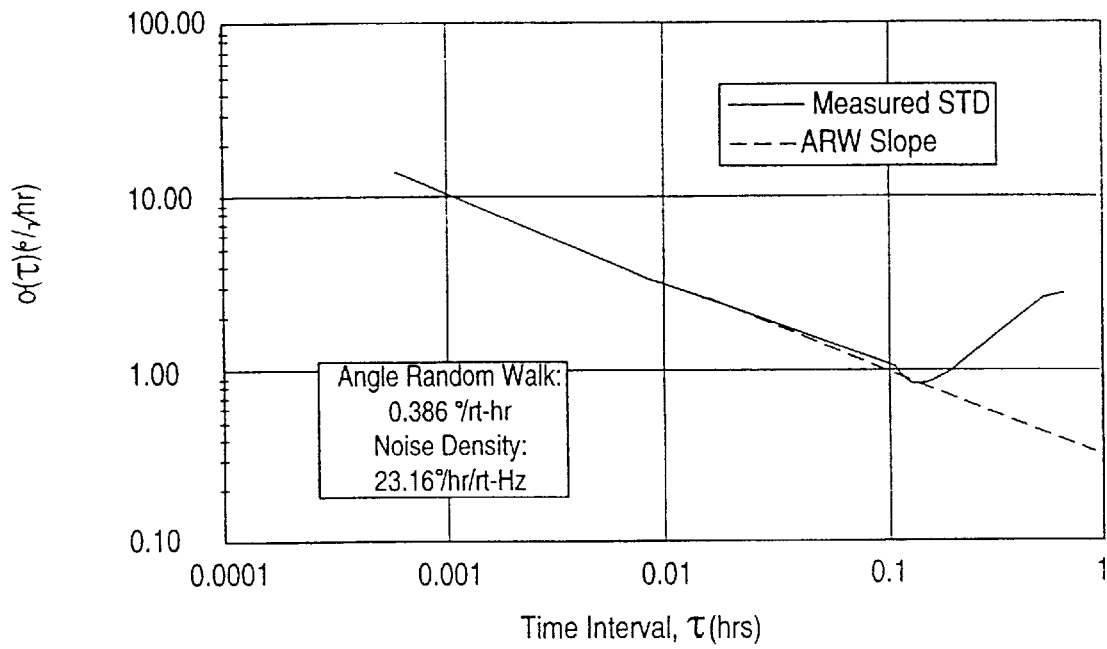
FIG. 5(a) is a graph of performance data in the form of an Allan variance analysis for a reduced minimum configuration IFOG system of the current invention.
Figure 5B:
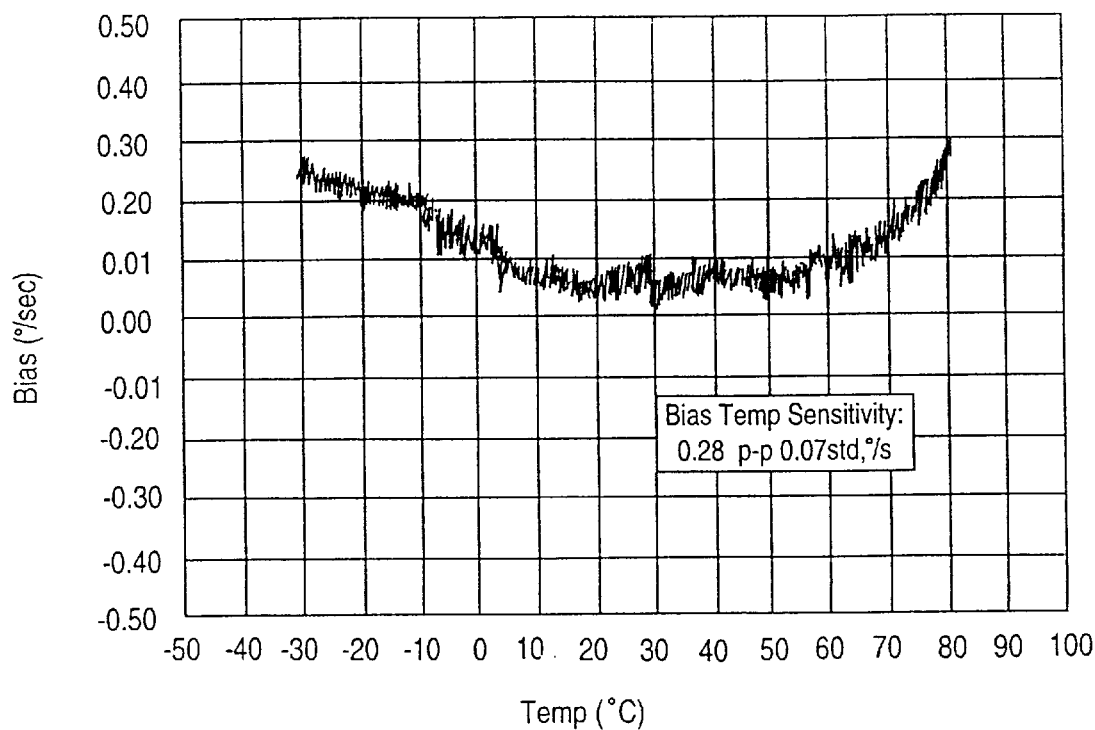
FIG. 5(b) is graph of performance data in the form of bias temperature sensitivity for a reduced minimum configuration IFOG of the current invention.

Both gyro configurations were run through a series of tests to measure key performance parameters. A summary of the results compared to a commercially available part, the Andrew AUTOGYRO® Navigator, is shown in Table 1. FIGS. 4*a* and 5*a* compare the angle random walk (ARW) and bias stability, determined by Allan variance analysis, of the minimum versus the reduced minimum configuration gyros. Both gyros had ARW figures of approximately 20(°/hr)/√Hz, and bias stability limits of 2°/hr after 12 minutes of elapsed time. FIGS. 4*b* and 5*b* compare the bias of temperature sensitivity. A temperature range of −40 to +75° C. was used for this test. The conventional minimum configuration gyro out performed the reduced configuration gyro by a factor of two-to-one in the bias test. However, this is mainly due to the differences in the temperature sensitivity of the analog demodulation electronics. The bias temperature sensitivity for the minimum configuration was measured at 0.03°/s or 108°/hr for one standard deviation. The reduced configuration performed at 0.07/s or 252°/hr. Table 1 is a table of performances of minimum configuration and reduced minimum configuration gyroscope system performance of the present invention. The scale factor non-linearity for both configurations was similar, as indicated in Table 1. A level of 0.2% rms was achieved for the typical automotive rotation rate range of +/−50°/s.

TABLE 1

| Tested Parameter | Min. Config. (FIG. 4) | Reduced Min. Config. (FIG. 5) | Specifications | Units |
| --- | --- | --- | --- | --- |
| Scale Factor Non-linearity | 0.19 | 0.32 | 0.20 | o/o , rms |
| Bias Drift Const. Temp. | 0.011, 0.002 | 0.014, 0.003 | 0.01, 0.002 | o/s, p-p, 1σ |
| Bias Temp. Sensitivity | 0.16, 0.03 | 0.28, 0.07 | —, — | o/s, p-p, 1σ |
| Angled Random Walk | 19.2, 0.32 | 23.2, 0.39 | 20, 0.33 | (o/hr)/√Hz, o/√hr |

What is claimed is:

1. An interferometric fiber optic gyroscope (IFOG) system comprising:
    a fiber sensing coil;
    a light source emitting light with an associated light source intensity, said source having a front output and back output;
    an optical coupler attached to said front output for receiving said light from said light source, said coupler creating two substantially equal intensity light beams for simultaneous transmission into said sensing coil said coupler attached to said coil;
    wherein said fiber sensing coil supplies return light to said coupler from said equal intensity light beams and said coupler combines and interferes said return light into a combined light beam;
    an optical phase modulator having a phase modulation amplitude, said modulator coupled to said coil;
    an oscillator coupled to said modulator said oscillator producing a periodic voltage which controls said phase modulation amplitude;
    light detection means for detecting and converting said combined light beam into an electrical current, said combined light signal transmitted through said light source and received by said detecting means coupled to said light source at said back output;
    an electrical amplifier coupled to said detector for converting said current into an electrical voltage;
    a direct current block, a rectifier, an integrating comparator, and light source drive means coupled to said amplifier, for controlling said associated light source intensity; and
    electrical signal processing means coupled to said amplifier for processing said voltage and providing an output signal proportional to the angular rotation rate input of said sensing coil, wherein the output signal is substantially temperature-independent.

2. The IFOG system of claim 1 wherein said light source is selected from the group including a semiconductor light source and rare-earth doped fiber light source.

3. The IFOG system of claim 2 wherein said direct current block, said rectifier, said integrating comparator, and said light source drive means comprises means for adjusting said intensity.

4. The IFOG system of claim 3 wherein said direct current block comprises a high pass filter.

5. The IFOG system of claim 4 wherein said rectifier is a half-wave rectifier.

6. The IFOG system of claim 5 wherein said oscillator is a piezo-electric transducer phase modulator drive supplying a fixed amplitude and fixed frequency periodic waveform.

7. The IFOG system of claim 5 wherein said oscillator is a piezo-electric transducer phase modulator drive supplying a fixed amplitude and self-resonant frequency waveform.

8. The IFOG system of claim 5 wherein said oscillator is a piezo-electric transducer phase modulator drive supplying an adjustable gain control, self resonant frequency waveform.

9. The IFOG system of claim 4 wherein said rectifier is a full-wave rectifier.

10. The IFOG system of claim 9 wherein said oscillator is a piezo-electric transducer phase modulator drive supplying a fixed amplitude and fixed frequency periodic waveform.

11. The IFOG system of claim 9 wherein said oscillator is a piezo-electric transducer phase modulator drive supplying a fixed amplitude and self-resonant frequency waveform.

12. The IFOG system of claim 9 wherein said oscillator is a piezo-electric transducer phase modulator drive supplying an adjustable gain control, self resonant frequency waveform.

13. The IFOG system of claim 3 wherein said direct current block comprises a band pass filter.

14. The IFOG system of claim 13 wherein said rectifier is a half-wave rectifier.

15. The IFOG system of claim 14 wherein said oscillator is a piezo-electric transducer phase modulator drive supplying a fixed amplitude and fixed frequency periodic waveform.

16. The IFOG system of claim 14 wherein said oscillator is a piezo-electric transducer phase modulator drive supplying a fixed amplitude and self-resonant frequency waveform.

17. The IFOG system of claim 14 wherein said oscillator is a piezo-electric transducer phase modulator drive supplying an adjustable gain control, self resonant frequency waveform.

18. The IFOG system of claim 13 wherein said rectifier is a full-wave rectifier.

19. The IFOG system of claim 18 wherein said oscillator is a piezo-electric transducer phase modulator drive supplying a fixed amplitude and fixed frequency periodic waveform.

20. The IFOG system of claim 18 wherein said oscillator is a piezo-electric transducer phase modulator drive supplying a fixed amplitude and self-resonant frequency waveform.

21. The IFOG system of claim 18 wherein said oscillator is a piezo-electric transducer phase modulator drive supplying an adjustable gain control, self resonant frequency waveform.

22. An interferometric fiber optic gyroscope (IFOG) system comprising:
    a fiber sensing coil; a light source transmitting light with an associated light source intensity, said source having a front output and back output;
    an optical coupler attached to said front output for receiving said light from said light source, said coupler creating two substantially equal intensity light beams for simultaneous transmission into said sensing coil, said coupler attached to said coil;
    wherein said fiber sensing coil supplies return light to said coupler from said equal intensity light beams and said coupler combines and interferes said return light into a combined light beam;
    a polarizer coupled between said front output and said optical coupler, said polarizer polarizing said light from said source and said return light;
    an optical phase modulator having a phase modulation amplitude, said modulator coupled to said coil;
    an oscillator coupled to said modulator said oscillator producing a periodic voltage which controls said phase modulation amplitude;
    light detection means for detecting and converting said combined light beam into an electrical current, said combined light signal being transmitted through said light source and received by said detecting means coupled to said light source at said back output;
    an electrical amplifier coupled to said detector for converting said current into an electrical voltage;

a direct current block, a rectifier, an integrating comparator, and light source drive means coupled to said amplifier, for controlling said associated light source intensity;

and electrical signal processing means coupled to said amplifier for processing said voltage and providing an output signal proportional to the angular rotation rate input of said sensing coil, wherein the output signal is substantially temperature-independent.

23. The IFOG system of claim 22 wherein said light source is selected from the group including a semiconductor light source and rare-earth doped fiber light source.

24. The IFOG system of claim 23 wherein said direct current block, said rectifier, said integrating comparator, and said light source drive means comprises means for adjusting said intensity.

25. The IFOG system of claim 24 wherein said direct current block comprises a high pass filter.

26. The IFOG system of claim 25 wherein said rectifier is a half-wave rectifier.

27. The IFOG system of claim 26 wherein said oscillator is a piezo-electric transducer phase modulator drive supplying a fixed amplitude and fixed frequency periodic waveform.

28. The IFOG system of claim 26 wherein said oscillator is a piezo-electric transducer phase modulator drive supplying a fixed amplitude and self-resonant frequency waveform.

29. The IFOG system of claim 26 wherein said oscillator is a piezo-electric transducer phase modulator drive supplying an adjustable gain control, self resonant frequency waveform.

30. The IFOG system of claim 25 wherein said rectifier is a full-wave rectifier.

31. The IFOG system of claim 30 wherein said oscillator is a piezo-electric transducer phase modulator drive supplying a fixed amplitude and fixed frequency periodic waveform.

32. The IFOG system of claim 30 wherein said oscillator is a piezo-electric transducer phase modulator drive supplying a fixed amplitude and self-resonant frequency waveform.

33. The IFOG system of claim 30 wherein said oscillator is a piezo-electric transducer phase modulator drive supplying an adjustable gain control, self resonant frequency waveform.

34. The IFOG system of claim 24 wherein said direct current block comprises a band pass filter.

35. The IFOG system of claim 34 wherein said rectifier is a half-wave rectifier.

36. The IFOG system of claim 35 wherein said oscillator is a piezo-electric transducer phase modulator drive supplying a fixed amplitude and fixed frequency periodic waveform.

37. The IFOG system of claim 35 wherein said oscillator is a piezo-electric transducer phase modulator drive supplying a fixed amplitude and self-resonant frequency waveform.

38. The IFOG system of claim 35 wherein said oscillator is a piezo-electric transducer phase modulator drive supplying an adjustable gain control, self resonant frequency waveform.

39. The IFOG system of claim 34 wherein said rectifier is a full-wave rectifier.

40. The IFOG system of claim 39 wherein said oscillator is a piezo-electric transducer phase modulator drive supplying a fixed amplitude and fixed frequency periodic waveform.

41. The IFOG system of claim 39 wherein said oscillator is a piezo-electric transducer phase modulator drive supplying a fixed amplitude and self-resonant frequency waveform.

42. The IFOG system of claim 39 wherein said oscillator is a piezo-electric transducer phase modulator drive supplying an adjustable gain control, self resonant frequency waveform.

43. An interferometric fiber optic gyroscope (IFOG) system comprising: a fiber sensing coil;

a light source transmitting light with an associated light source intensity, said source having a front output;

a first optical coupler attached to said front output for receiving said light from said light source, said coupler splitting said light into first and second beams, said second beam being dissipated by said coupler;

a second optical coupler attached to said first coupler and to said coil, said second coupler receiving said first beam, said second coupler creating two substantially equal intensity light beams for simultaneous transmission into said sensing coil;

wherein said fiber sensing coil supplies return light to said second coupler from said equal intensity beams and said second coupler combines and interferes said return light into a combined light beam;

an optical phase modulator having a phase modulation amplitude, said modulator coupled to said coil;

an oscillator coupled to said modulator said oscillator producing a periodic voltage which controls said phase modulation amplitude;

light detection means for detecting and converting said combined light beam into an electrical current, said combined light signal being transmitted through said first coupler and received by said detecting means coupled to said first coupler;

an electrical amplifier coupled to said detector for concerting said current into an electrical voltage;

a direct current block, a rectifier, an integrating comparator, and light source drive means coupled to said amplifier, for controlling said associated light source intensity;

and electrical signal processing means coupled to said amplifier for processing said voltage and providing an output signal proportional to the rotation rate input of said sensing coil, wherein the output signal is substantially temperature-independent.

44. The IFOG system of claim 43 wherein said light source is selected from the group including a semiconductor light source and rare-earth doped fiber light source.

45. The IFOG system of claim 44 wherein said direct current block, said rectifier, said integrating comparator, and said light source drive means comprises means for adjusting said intensity.

46. The IFOG system of claim 45 wherein said direct current block comprises a high pass filter.

47. The IFOG system of claim 46 wherein said rectifier is a half-wave rectifier.

48. The IFOG system of claim 47 wherein said oscillator is a piezo-electric transducer phase modulator drive supplying a fixed amplitude and fixed frequency periodic waveform.

49. The IFOG system of claim 47 wherein said oscillator is a piezo-electric transducer phase modulator drive supplying a fixed amplitude and self-resonant frequency waveform.

50. The IFOG system of claim 47 wherein said oscillator is a piezo-electric transducer phase modulator drive supplying an adjustable gain control, self resonant frequency waveform.

51. The IFOG system of claim 46 wherein said rectifier is a full-wave rectifier.

52. The IFOG system of claim 51 wherein said oscillator is a piezo-electric transducer phase modulator drive supplying a fixed amplitude and fixed frequency periodic waveform.

53. The IFOG system of claim 51 wherein said oscillator is a piezo-electric transducer phase modulator drive supplying a fixed amplitude and self-resonant frequency waveform.

54. The IFOG system of claim 51 wherein said oscillator is a piezo-electric transducer phase modulator drive supplying an adjustable gain control, self resonant frequency waveform.

55. The IFOG system of claim 45 wherein said direct current block comprises a band pass filter.

56. The IFOG system of claim 55 wherein said rectifier is a half-wave rectifier.

57. The IFOG system of claim 56 wherein said oscillator is a piezo-electric transducer phase modulator drive supplying a fixed amplitude and fixed frequency periodic waveform.

58. The IFOG system of claim 56 wherein said oscillator is a piezo-electric transducer phase modulator drive supplying a fixed amplitude and self-resonant frequency waveform.

59. The IFOG system of claim 56 wherein said oscillator is a piezo-electric transducer phase modulator drive supplying an adjustable gain control, self resonant frequency waveform.

60. The IFOG system of claim 55 wherein said rectifier is a full-wave rectifier.

61. The IFOG system of claim 60 wherein said oscillator is a piezo-electric transducer phase modulator drive supplying a fixed amplitude and fixed frequency periodic waveform.

62. The IFOG system of claim 60 wherein said oscillator is a piezo-electric transducer phase modulator drive supplying a fixed amplitude and self-resonant frequency waveform.

63. The IFOG system of claim 60 wherein said oscillator is a piezo-electric transducer phase modulator drive supplying an adjustable gain control, self resonant frequency waveform.

64. An interferometric fiber optic gyroscope (IFOG) system comprising: a fiber sensing coil;
  a polarizer;
  a light source transmitting light with an associated light source intensity, said source having a front output;
  a first optical coupler attached to said front output for receiving said light from said light source, said coupler splitting said light into first and second beams, wherein said polarizer is coupled to said first coupler and receives said first beam, said second beam being dissipated by said coupler;
  a second optical coupler attached to said polarizer and to said coil, said second coupler creating two substantially equal intensity light beams for simultaneous transmission into said sensing coil;
  wherein said fiber sensing coil supplies return light to said second coupler from said equal intensity light beams and said second coupler combines and interferes said return light into a combined light beam and said polarizer polarizes said first beam from said first coupler and said return light;
  an optical phase modulator having a phase modulation amplitude, said modulator coupled to said coil;
  an oscillator coupled to said modulator said oscillator producing a periodic voltage which controls said phase modulation amplitude;
  light detection means for detecting and converting said combined light beam into an electrical current, said combined light signal being transmitted through said polarizer and said first coupler and received by said detecting means coupled to said first coupler;
  an electrical amplifier coupled to said detector for converting said current into an electrical voltage;
  a direct current block, a rectifier, an integrating comparator, and light source drive means for controlling said associated light source intensity;
  and electrical signal processing means coupled to said amplifier for processing said voltage and providing an output signal proportional to the angular rotation rate input of said sensing coil, wherein the output signal is substantially temperature-independent.

65. The IFOG system of claim 64 wherein said light source is selected from the group including a semiconductor light source and rare-earth doped fiber light source.

66. The IFOG system of claim 65 wherein said direct current block, said rectifier, said integrating comparator, and said light source drive means comprises means for adjusting said intensity.

67. The IFOG system of claim 66 wherein said direct current block comprises a high pass filter.

68. The IFOG system of claim 67 wherein said rectifier is a half-wave rectifier.

69. The IFOG system of claim 68 wherein said oscillator is a piezo-electric transducer phase modulator drive supplying a fixed amplitude and fixed frequency periodic waveform.

70. The IFOG system of claim 68 wherein said oscillator is a piezo-electric transducer phase modulator drive supplying a fixed amplitude and self-resonant frequency waveform.

71. The IFOG system of claim 68 wherein said oscillator is a piezo-electric transducer phase modulator drive supplying an adjustable gain control, self resonant frequency waveform.

72. The IFOG system of claim 67 wherein said rectifier is a full-wave rectifier.

73. The IFOG system of claim 72 wherein said oscillator is a piezo-electric transducer phase modulator drive supplying a fixed amplitude and fixed frequency periodic waveform.

74. The IFOG system of claim 72 wherein said oscillator is a piezo-electric transducer phase modulator drive supplying a fixed amplitude and self-resonant frequency waveform.

75. The IFOG system of claim 72 wherein said oscillator is a piezo-electric transducer phase modulator drive supplying an adjustable gain control, self resonant frequency waveform.

76. The IFOG system of claim 66 wherein said direct current block comprises a band pass filter.

77. The IFOG system of claim 76 wherein said rectifier is a half-wave rectifier.

78. The IFOG system of claim 76 wherein said oscillator is a piezo-electric transducer phase modulator drive supplying a fixed amplitude and fixed frequency periodic waveform.

79. The IFOG system of claim 76 wherein said oscillator is a piezo-electric transducer phase modulator drive supplying a fixed amplitude and self-resonant frequency waveform.

80. The IFOG system of claim 76 wherein said oscillator is a piezo-electric transducer phase modulator drive supplying an adjustable gain control, self resonant frequency waveform.

81. The IFOG system of claim 76 wherein said rectifier is a full-wave rectifier.

82. The IFOG system of claim 81 wherein said oscillator is a piezo-electric transducer phase modulator drive supplying a fixed amplitude and fixed frequency periodic waveform.

83. The IFOG system of claim 81 wherein said oscillator is a piezo-electric transducer phase modulator drive supplying a fixed amplitude and self-resonant frequency waveform.

84. The IFOG system of claim 81 wherein said oscillator is a piezo-electric transducer phase modulator drive supplying an adjustable gain control, self resonant frequency waveform.

* * * * *